United States Patent [19]

Nishimura

[11] Patent Number: 5,719,355
[45] Date of Patent: Feb. 17, 1998

[54] COMBINATIONAL WEIGHING METHOD AND APPARATUS

[75] Inventor: Ryoji Nishimura, Shiga, Japan

[73] Assignee: Ishida Co., Ltd., Japan

[21] Appl. No.: 297,090

[22] Filed: Aug. 29, 1994

[30] Foreign Application Priority Data

Sep. 10, 1993 [JP] Japan ................. 5-249876
Oct. 29, 1993 [JP] Japan ................. 5-294682

[51] Int. Cl.$^6$ ................................ G01G 19/00
[52] U.S. Cl. ...................... 177/25.18; 177/103
[58] Field of Search .................... 177/25.18, 103

[56] References Cited

U.S. PATENT DOCUMENTS

| | | | |
|---|---|---|---|
| 4,512,427 | 4/1985 | Minamida | 177/25.18 X |
| 4,529,050 | 7/1985 | Mosher et al. | 177/25.18 X |
| 4,570,728 | 2/1986 | Toyoda | 177/25.18 X |
| 4,642,788 | 2/1987 | Haze | 177/25.18 X |

*Primary Examiner*—Michael L. Gellner
*Assistant Examiner*—Randy W. Gibson
*Attorney, Agent, or Firm*—Majestic, Parsons, Siebert & Hsue, P.C.

[57] ABSTRACT

Combinational weighing is carried out firstly by calculating combinations of weight signals from a plurality of weighing devices each weighing a batch of objects to be packaged and selecting a combination having a total weight satisfying a specified criterion with respect to a target value, and secondly by re-checking the weight signals from the weighing devices of the selected combination before discharging the objects therefrom. The value of the difference between the total weights obtained at the time of the combinational calculations and at the re-checking time is stored cumulatively after each cycle of operation, and a new target value is calculated and set after each cycle from many stored difference values from previous cycles in order to improve the work efficiency and the yield at the same time. According to a preferred embodiment, the difference between the weight values obtained at these two times of measurement is cumulatively stored after each cycle for all weighing devices and a new target value is calculated by considering the distributions of past difference values corresponding to the individual weighing devices of the selected combination.

16 Claims, 3 Drawing Sheets

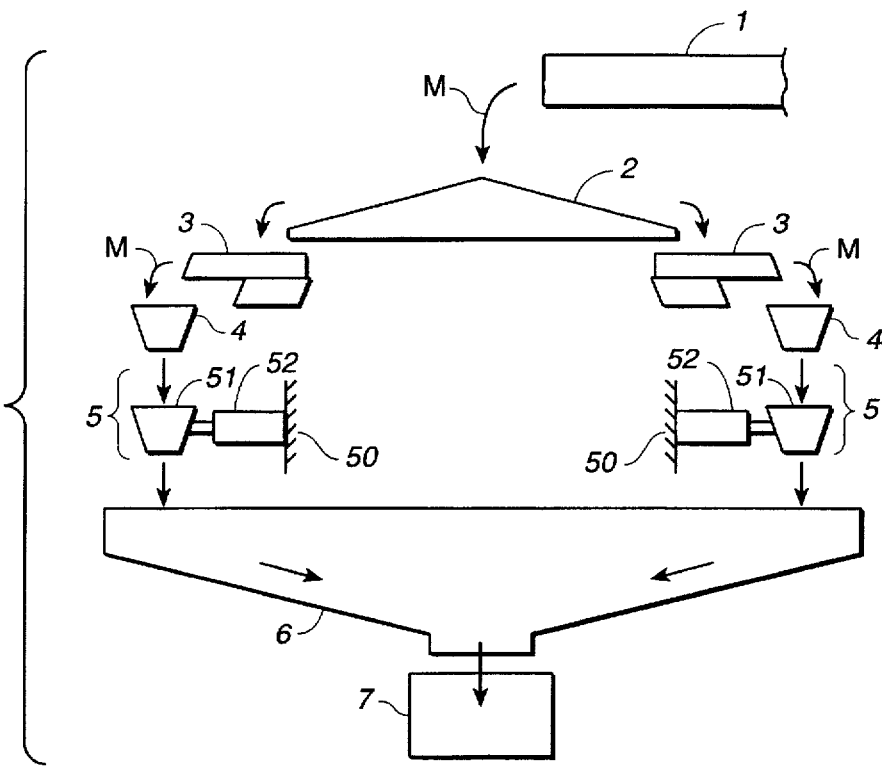
FIG._1
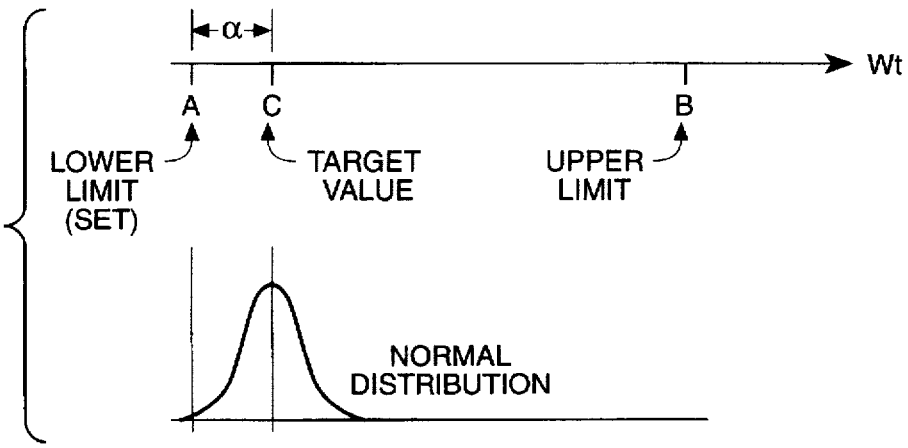
FIG._3
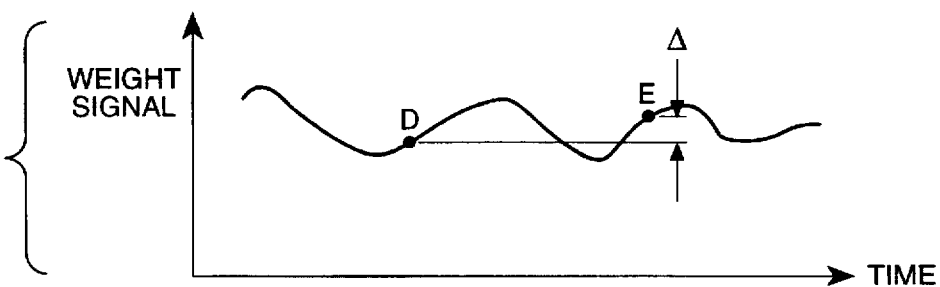
FIG._4

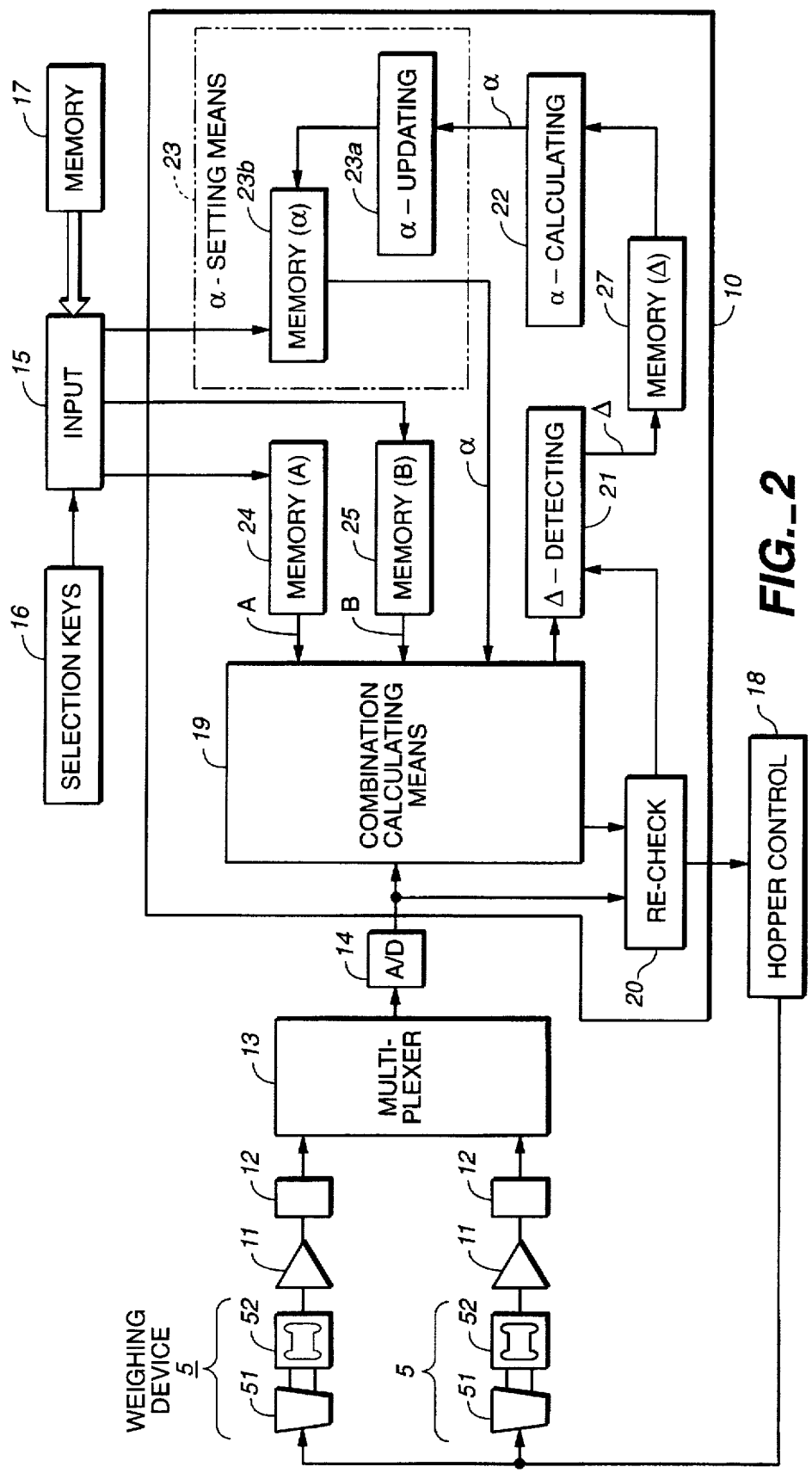
FIG._2

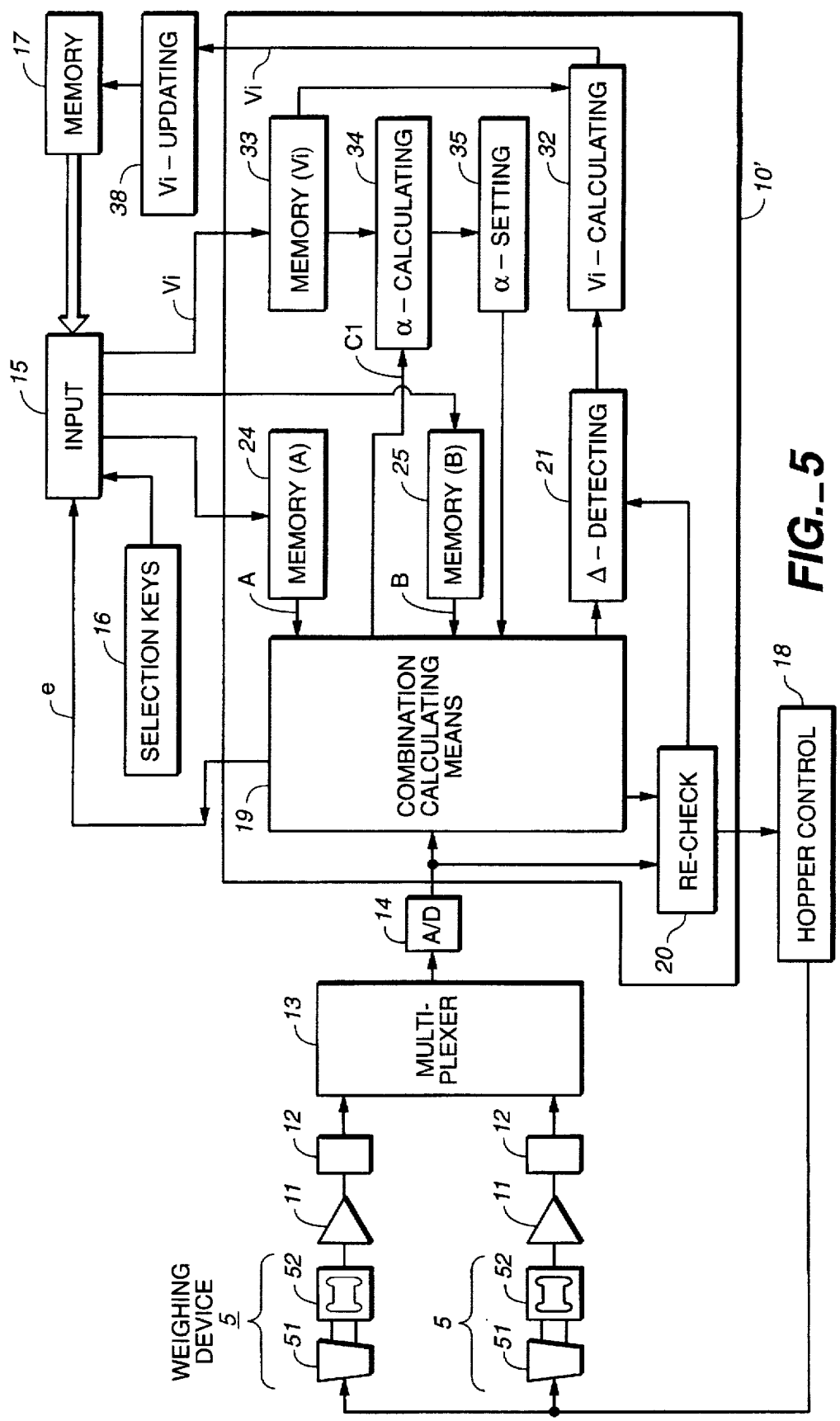
FIG._5

COMBINATIONAL WEIGHING METHOD AND APPARATUS

BACKGROUND OF THE INVENTION

This invention relates to a method of and an apparatus for combinational weighing such that a large number of objects, such as food items having a desired total weight, can be packaged inside a bag.

For collecting a large number of objects for automatic packaging, it has been known to weigh the objects separately in batches by using a plurality of weighing devices and to make combinations of the weight signals from these weighing devices. A lower limit value is set, and a target value is obtained by adding a certain correction value to this lower limit value. A particular combination with a total weight close to this target value within a certain allowable range is selected, and the batches of objects from the selected combination of weighing devices are discharged into an automatic packaging machine.

In other words, in order to make it absolutely certain that no merchandise with insufficient weight will be produced, a target value C is set between a certain specified lower limit value A and an upper limit value B by adding a certain specified correction value α to the lower limit value A, as shown in FIG. 3, and a combination is selected such that its total weight will not be less than this target value C. Before the objects are discharged from the selected combination of weighing devices, however, the total weight is checked again by inputting and adding the weight signals from the selected weighing devices, as disclosed, for example, in Japanese Patent Publication Tokko 2-54885. The weighed objects are not discharged if their total weight is found to be less than the specified lower limit value such that no merchandise with insufficient weight will be produced.

The correction value α is determined in view of the small variations in the weight signals from the individual weighing devices, which may be caused by the vibrations of the weighing devices when objects are dropped onto the associated weigh hoppers as well as the vibrations of the floor. If a weight signal is received at time D for combinational calculations and the total weight of the selected combination is checked at a later time E, there is likely to be a difference $\Delta$ in signal level between the two points in time D and E, as shown in FIG. 4. The level difference $\Delta$ may be positive or negative. If it is negative, the weight at the time of the re-check may be less than the lower limit value A, and the discharge of the objects from the selected combination of weighing devices is prevented in order to avoid the production of an underweight product. For this reason, the correction value α is selected such that the effects of the signal level difference $\Delta$ can be eliminated and the reduction in yield because of the occurrence of underweight combination can be better controlled.

If the distribution of the signal level difference $\Delta$ (that is, the distribution of the differences in measured weight value) is assumed to be a normal distribution with standard deviation given by $\sigma_1$, and if N weighing devices are selected by combinational calculations, the distribution of total weights is also a normal distribution, but its standard deviation $\sigma_N$ becomes $\sigma_1 \sqrt{N}$. Since 99.8% of the level differences will fall within three times this standard deviation $\sigma_N$, or within the width of $\pm 3\sigma_N$, if the correction value α is set equal to $3\sigma_N = 3\sigma_1 \sqrt{N}$, the fraction of selected combinations considered underweight will be reduced to less than 0.2%.

It is not desirable, however, to change the target value whenever there is a change in the value of N during combinational calculations, because this will adversely affect the time required for the weighing. In order to carry out combinational calculations efficiently, an average number $N_L$ of the selected weighing devices is used to determine the correction value α as $3\sigma_1 \sqrt{N_L}$. If the lower limit value is set to 100 g and ten weighing devices are used, the standard deviation $\sigma_1$ is empirically set equal to 0.1 g and the average number $N_L$ of combined weighing devices is set equal to 4 such that the correction value α becomes 0.6 (=3×0.1×√4)g. If the correction value α is increased, underweight combinations will occur less frequently and the work efficiency will accordingly improve, but since the average amount of the objects that are put in a bag will increase, the yield is adversely affected.

In summary, it is desired to provide an improved combinational weighing method, as well as an apparatus therefor, capable of reducing the frequency of occurrence of underweight combination at the time of the re-check while improving both the work efficiency of combinational weighing and the yield. With a prior art combinational weighing apparatus, however, the correction value is a constant which is preliminarily determined from the average number $N_L$ and the empirically determined value of the standard deviation. This makes it difficult to improve both the yield and the work efficiency for all combinational weighing apparatus having individually different characteristics.

SUMMARY OF THE INVENTION

It is therefore a basic object of this invention to provide a combinational weighing method and an apparatus therefor, capable of improving both the yield and the work efficiency.

A combinational weighing method according to this invention, with which the above basic objects can be accomplished, may be characterized by the steps of detecting the difference between measured combined weight values at the time of combinational calculations and the re-check time and setting the correction value on the basis of the past values of the difference such that desired work efficiency and yield can be achieved. With such a method according to the invention, the difference in measured combined weight value is detected between the time of combinational calculations and the re-check time, and a new correction value is set on the basis of not only this difference value but also the past difference values obtained in earlier cycles of the combinational calculations. This newly calculated correction value is added to the specified lower limit value to obtain a new target value, and the next cycle of combinational calculations is carried out by using this new target value.

A combinational weighing apparatus for using this method may be characterized as comprising difference detecting means for detecting the difference in measured combined weight between the time of combinational calculations and the re-check time, correction value calculating means for using past difference values detected by the difference detecting means and thereby calculating a correction value appropriately so as to obtain desired yield and work efficiency, and setting means for setting the correction value thus calculated by the correction value calculating means in the combination calculating means.

It is not always to be taken for granted, however, that the distribution of measured weight differences is about the same among the weighing devices of an apparatus for combinational weighing and that the number of weighing devices selected is approximately constant. Consider a situation, for example, where an air conditioner is installed near the combinational weighing apparatus such that some of its weighing devices which are more effectively cooled thereby tend to have larger differences in weight values while those not being effectively cooled have smaller differences. In such a situation, if only those weighing devices with large differences are selected and combined, there is an increased probability that the total weight at the re-check time becomes smaller than the lower limit value that has been set. This would affect the work efficiency adversely. If only those weighing devices with small differences are selected and combined, on the other hand, there is an increased probability that the total weight becomes significantly larger than the lower limit value. This would adversely affect the yield.

It is therefore a further object of the invention to provide a combinational weighing method and an apparatus therefor, capable of achieving the aforementioned basic object in spite of effects from the environment as described above.

A combinational weighing method, with which the aforementioned further object can also be achieved, may be characterized by the steps of detecting the difference in measured weight values for each individual weighing device and setting the correction values on the basis of the past difference values on those weighing devices in the selected combination. Similarly, a combinational weighing apparatus, with which the aforementioned further object can also be achieved, may be characterized as comprising difference detecting means for detecting the differences in measures weight values for individual weighing devices and correction value calculating means for using past difference values from the weighing devices of the selected combination to calculate a correction value.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic drawing which shows the structure of a combinational weighing apparatus embodying the invention;

FIG. 2 is a block diagram of a combinational weighing apparatus shown in FIG. 1;

FIG. 3 is a graph for showing how a target value is set;

FIG. 4 is a graph for showing the waveform of a weight signal; and

FIG. 5 is a block diagram of another combinational weighing apparatus embodying the invention.

DETAILED DESCRIPTION OF THE INVENTION

A weighing apparatus, embodying the present invention to achieve the aforementioned basic object, may be of the structure schematically shown in FIG. 1, comprising a conically shaped dispersion feeder 2 placed below a conveyor 1 for receiving objects M such as food items to be weighed from a production line, transporting them to a position above the dispersion feeder 2 and dropping them at the center of the dispersion feeder 2. A plurality of radially oriented feeders 3 are disposed around the outer periphery of the dispersion feeder 2 and are adapted to transport the objects M radially outward, while vibrating, and to drop them through pool hoppers 4 disposed therebelow into a plurality of weighing devices 5.

Each of the weighing devices 5 is composed of a load cell 52 and a weigh hopper 51 for receiving a batch of the objects M discharged from the corresponding one of the pool hoppers 4. The load cell 52 has one of its vertical edges affixed to a frame structure 50, the other edge supporting the weigh hopper 51 so as to detect the weight of the objects M supplied into this weigh hopper 51 and to output a weight signal indicative of the measured weight to a central processing unit (CPU), shown at 10 in FIG. 2 and to be described below. A discharge chute 6 is provided below the weigh hoppers 51, and an automatic packaging machine 7 is disposed further below the chute 6.

In order to input the weight signals from the load cells 52 into the CPU 10, each load cell 52 is connected to an amplifier 11 and a filter 12, and there is a multiplexer 13 connected to the output sides of these filters 12. The weight signals are inputted into the CPU 10 from this multiplexer 13 through an analog-to-digital converter (A/D) 14. The CPU 10 is also connected, on its input side, to an input means 15 for retrieving various data from a memory device 17 and inputting them into the CPU 10 in response to the user's operation on selection keys 16. On the output side of the CPU 10, there is a hopper control circuit 18 for selectively opening and closing the individual weigh hoppers 51.

The CPU 10 includes a combination calculating means 19, a re-check means 20, a difference detecting means 21, correction value calculating means 22, correction value setting means 23, a memory means for storing a lower limit value 24, a memory means for storing an upper limit value 25, and a memory means for storing difference values 27.

The combination calculating means 19 is for carrying out combinational calculations of the weight signals from the load cells 52 and selecting a combination within the allowable range A–B and near the target value C calculated by adding a correction value α to a specified lower limit value A, as explained above with reference to FIG. 3.

After a combination has been selected by the combination calculating means 19 but before the weighed objects M are discharged from the weigh hoppers 51 of the weighing devices 5 of the selected combination, the combination calculating means 19 outputs to the re-check means 20 a signal indicating which of the weighing devices 5 have been selected. Upon receiving this signal, the re-check means 20 receives weight signals from the load cells 52 of the weighing devices of the selected combination and adds them together to re-check the result of the combinational calculations. If this re-check value obtained by the re-check means 20 falls between A and B, or within the allowable range, the signal from the combination calculating means 19, indicative of the selected combination, is directly transmitted to the hopper control circuit 18 and the weigh hoppers 51 of the selected combination are opened. If the re-check value is below the lower limit value A, no signal is transmitted from the re-check means 20 to the hopper control means 18, and the weigh hoppers 51 are not opened to discharge the objects M therein.

The difference detecting means 21 is for detecting the difference Δ between the total weight calculated and selected by the combination calculating means 19 at the time of the combination calculations and the re-check value obtained by the re-check means 20 at the re-check time.

The difference value Δ thus detected is stored in the difference-storing memory means 27 for storing not only the difference value Δ which has just been detected by the difference detecting means 21 for the cycle of combinational calculations completed by the combination calculating means 19, but also all of the difference values similarly detected in the earlier cycles of combination calculations.

The correction value calculating means 22 is for calculating a new correction value α on the basis of the difference values Δ obtained earlier by the difference detecting means 21 and now stored in the difference-storing memory means 27 such that desired work efficiency and yield can be attained. The new correction value α may be set equal to the largest of the absolute values of the differences Δ currently stored in the difference-storing memory means 27. The correction value α, so set, may be too large because it will tend to reduce the yield somewhat, but the work efficiency can be made close to 100%. This method of setting the correction value α is particularly suited when the distribution of the aforementioned difference values is uniform. If the difference values Δ are distributed as shown in FIG. 3 in the form of a normal distribution, on the other hand, it is generally advantageous to set the correction value α equal to three times the standard deviation $\sigma_1$ of this distribution which is calculated each time. If the correction value α is so set, 99.8% of the difference values Δ may be expected to become included, as explained above. Thus, not only is the work efficiency improved but also the correction value α can be made smaller and hence the yield can be improved, too. As a further alternative, the correction value α may be set equal to the average of the absolute values of the difference values Δ obtained previously and now in the difference-storing memory means 27. This method is advantageous in that the correction value α can be made even smaller and hence that the yield can be improved still further, although the work efficiency may be reduced somewhat.

The correction value setting means 23 includes an updating means 23a and a memory means 23b. The correction value α, calculated by the correction value calculating means 22, is inputted into the updating means 23a to have the older value updated, and the updated correction value α is stored in the memory means 23b and transmitted to the combination calculating means 19.

Next, a combinational weighing method using the weighing apparatus explained above will be described.

As shown in FIG. 1, the objects M to be weighed are supplied from the conveyor 1 to the dispersion feeder 2 and then dropped into the pool hoppers 4 through the vibrating radial feeders 3. They are further dropped from these pool hoppers 4 down into the weigh hoppers 51 of the weighing devices 5 disposed below the pool hoppers 4, and the batches of the objects M thus placed in the plurality of weigh hoppers 51 are respectively weighed by the associated load cells 52. The weight signals indicative of the measured weights outputted from the load cells 52 are received by the combination calculating means 19 inside the CPU 10. The user operates the selection keys 16 to select from the memory device 17 a correction value α for the objects M, a lower limit value A and an upper limit value B and causes the input means 15 to temporarily store them respectively in the memory means 23b, 24 and 25. These values are then transmitted therefrom into the combination calculating means 19, by which combinations of the weight signals from the load cells 52 are calculated and a particular combination is selected which is the closest, within the range A–B, to the target value C obtained by adding the lower limit value A and the correction value α together.

After the combination calculations are done by the combination calculating means 19, the weight signals from the load cells 52 associated with the selected weighing devices 5 are added together by the re-check means 20 to re-check the combinational calculations by the combination calculating means 19. If the sum thus obtained by the re-check means 20 (or the re-check value) is within the allowable range A–B, the hopper control means 18 causes the weigh hoppers 51 of the selected weighing devices 5 to be opened, thereby dropping the objects M from these weigh hoppers 51 down to the discharge chute 6 shown in FIG. 1 to be packaged by the automatic packaging machine 7. If the re-check value is less than A, on the other hand, the weighed objects M are not discharged and the occurrence of underweight products can be thereby prevented.

The difference Δ between the combined weight calculated by the combination calculating means 19 and the re-check value obtained by the re-check means 20 is calculated by the difference detecting means 21 and is cumulatively stored in the difference-storing memory means 27. In other words, not only the difference value Δ most recently obtained but also the differences Δ obtained in earlier-performed cycles of combinational calculations are stored therein and used by the correction value calculating means 22 to determine an optimum correction value α that will improve both the work efficiency and the yield. The new correction value α, thus determined, is transmitted to the updating means 23a to update the previously determined correction value, and the updated correction value α is stored in the memory means 23b. In the next cycle of combinational calculations, the new correction value α, retrieved from the memory means 23b together with the lower and upper limit values A and B respectively stored in the memory means 24 and 25, is inputted to the combination calculating means 19, and a new target value C is obtained by adding the lower limit value A and the newly updated correction value α.

In summary, the difference between the total weight of the selected combination obtained by the combination calculating means and the re-check value obtained somewhat later is detected after each cycle of combinational calculations, and the target value for the combinational calculations is updated after each cycle by using all these difference values obtained in the earlier cycles. As a result, both the work efficiency of the weighing apparatus and its yield can be improved at the same time.

Next, another combinational weighing method and apparatus according to a second embodiment of the invention, with which the aforementioned further object can be achieved, will be described with reference to FIG. 5, wherein components which are substantially equivalent to those in FIG. 2 and explained above with reference thereto are indicated by the same numerals. FIG. 5 shows another CPU 10' for replacing the one shown in FIG. 2. In other words, the combinational weighing apparatus to be described below may be viewed as being structures as shown in FIG. 1.

The CPU 10' shown in FIG. 5 is different from the CPU 10 in FIG. 2 in that there are included therein a dispersion calculating means 32, a memory means for storing dispersions 33, a correction value calculating means 34 and a correction value setting means 35. The apparatus also additionally includes a dispersion updating means 38.

According to the second embodiment of the invention, the dispersions $V_i$ of the distributions of the past differences in the weight values for the individual weighing devices are also stored in the memory device 17. After the combination calculating means 19 has selected a combination, these dispersion values $V_i$ are retrieved and temporarily stored in the dispersion-storing memory means 33. When a signal $c_1$ indicative of a selected combination is received from the combination calculating means 19, the correction value calculating means 34 uses the dispersions $V_i$ of the distributions of the weight values by these selected weighing devices to calculate a new correction value α, as will be explained more in detail below, and this correction value α is set in the combinational calculation means 19 by the correction value setting means 35.

The re-check means 20 functions generally as explained above with reference to FIG. 2, and the difference detecting means 21 detects the difference Δ between weight values from each of the selected weigh hoppers 51 at the time of the combination calculations and the time of the re-check. The dispersion calculating means 32 is for calculating new dispersion values $V_i$ from these difference values Δ for the selected weigh hoppers 51 obtained by the difference detecting means 21 as above and the previous dispersion values $V_i$ based on the past data from the dispersion-storing memory means 33. These newly obtained dispersion values $V_i$ are stored in the memory device 17 by the dispersion updating means 38, updating the older values stored in the memory device 17.

The correction value calculating means 34 treats the difference values Δ obtained by the difference detecting means 21 as time-sequenced data and estimates the dispersions $V_i$ corresponding to the weigh hoppers 51 of the selected combination by the means square method to calculate the new correction value α as follows.

Let $V_i$ be the dispersion of the distribution associated with one of the weigh hoppers 51 (identified by dummy index i). Then, the dispersion V of the distribution of the differences in total measured weight by the N weigh hoppers of a selected combination will be:

$$V = \Sigma_{i=1}^{N} V_i.$$

If the standard deviation is denoted by σ, it is given by:

$$\sigma = \sqrt{V} = \sqrt{(\Sigma_{i=1}^{N} V_i)}.$$

Consider a case, for example, where the combined weight from the second, fourth, fifth and eighth weigh hoppers is going to be calculated. In this situation, the dispersion $V = V_2 + V_4 + V_5 + V_8$ of the distribution of the total of the differences $\Delta_2$, $\Delta_4$, $\Delta_5$ and $\Delta_8$ of these individual weigh hoppers is calculated to obtain the standard deviation $\sigma = \sqrt{V}$. If the differences for all of these weigh hoppers 51 are normally distributed as shown in FIG. 3, the correction value α is set equal to 3σ (that is, three times the standard deviation). The correction value α thus obtained is added to the lower limit value A to obtain a new target value C for the next cycle of combinational calculations.

A combinational weighing method according to the second embodiment of the invention is different from the method described above with reference to FIG. 2 in that the selection keys 16 are operated to cause not only a lower limit value A and an upper limit value B but also initial dispersion values $V_i$ of the distributions of the differences in weight values corresponding to the selected objects M to be retrieved by the input means 15 from the memory device 17 to be temporarily stored respectively in the memory means 24, 25 and 33. These initial dispersion values $V_i$ are inputted to the correction value calculating means 34 whereby an initial correction value α is calculated and the correction value setting means 35 serves to input this initial correction value α to the combination calculating means 19. The lower and upper limit values A and B are also received by the combination calculating means 19.

When the combination signal $c_1$ indicating the selected combination is transmitted from the combination calculating means 19 to the correction value calculating means 34, the dispersions $V_i$ of the distributions of the differences of the weight values from the selected weigh hoppers 51 are retrieved thereby from the dispersion-storing memory means 33, and a correction value α corresponding to this combination of weigh hoppers 51 is calculated on the basis of these dispersion values $V_i$ and is set in the combination calculating means 19. The combination calculating means 19 then calculates combinations of weight signals from the load cells 52 in known manners. In other words, as many correction values α as there are combinations are calculated. If four out of ten weigh hoppers 10 are to be combined, $_{10}C_4$ different correction values α are calculated.

As the objects M are weighed, the difference values Δ are detected by the difference detecting means 21 for each of the selected weigh hoppers 51 and inputted to the dispersion calculating means 32 which serves to obtain new dispersion values $V_i$ on the basis of all of the past difference values Δ inclusive of those which have just been calculated. Such newly obtained dispersion values $V_i$ are used by the dispersion updating means 38 to update the old values stored in the memory device 17. After combinational calculations are completed and a combination of weigh hoppers 51 with a total weight within the range A–B is selected, a completion signal e is transmitted to the input means 15. The input means 15 thereupon retrieves the updated dispersion values $V_i$ from the memory device 17 and temporarily stores them in the dispersion-storing memory means 33. A new correction values α is calculated by the correction value calculating means 34 on the basis of these temporarily stored dispersion values $V_i$ and is inputted to the combination calculating means 19 to determine a new target value C for the next selection.

With such a method according to the second embodiment of the invention, the probability of the weight of objects M becoming less than the lower limit value A becomes extremely small. As a result, the work efficiency can be improved and the yield is also improved because the correction value α can be made as small as possible.

Moreover, since a correction value α is calculated for each selected combination on the basis of the differences Δ of the weight values from the selected weight hoppers 51 and a new target value C is determined accordingly for each different combination of the weigh hoppers 51, effects of the environment, for example, can be minimized and both the work efficiency and the yield can be improved.

By way of the same example considered above, the correction value α may be set equal to the largest of the absolute values of $\Delta_2$, $\Delta_4$, $\Delta_5$ and $\Delta_8$. In this case, the correction value α becomes larger and hence the yield is adversely affected, but the work efficiency can be increased to nearly 100%. This is particularly suited when the differences Δ are uniformly distributed.

If the correction value α is set equal to the average of the absolute values of the differences Δ, on the other hand, the correction value α can be made even smaller and hence the yield can be improved although the work efficiency is adversely affected somewhat.

The present invention is not limited to the kind of combinational weighing disclosed above. The invention can be applied, for example, to the kind of combinational weighing apparatus having memory hoppers below the weigh hoppers 51 and opening those of the weigh hoppers not selected in a combinational calculation to transfer their contents down to the corresponding ones of the memory hoppers such that the objects in such memory hoppers can also participate in the next cycle of combinational calculations.

In summary, combinational weighing apparatus and methods according to the present invention can improve both the work efficiency and the yield at the same time, without being influenced by environmental conditions.

What is claimed is:

1. In a combinational weighing method comprising the steps, in cycles, of:

combining first weight signals indicative of the weights of objects being weighed by a plurality of weighing devices;

selecting a combination of said weighing devices with a first total weight according to a predefined criterion depending on a target value which is obtained by adding a correction value to a preset lower limit value;

discharging objects from said selected combination of weighing devices;

obtaining, after said selecting step and before said discharging step, second weight signals indicative of re-checked weight values of objects in said selected combination of weighing devices; and obtaining a second total weight representative of the sum of said re-checked weight values;

the improvement wherein said method further comprises the steps of:

storing cumulatively a difference value between said first total weight and said second total weight after each cycle; and updating said correction value with reference to the stored difference values obtained in previous cycles such that desired work efficiency and yield can be attained.

2. The combinational weighing method of claim 1 wherein said correction value is updated according to the largest of the absolute values of said difference values obtained in previous cycles.

3. The combinational weighing method of claim 1 wherein said correction value is updated according to the average of the absolute values of said difference values obtained in previous cycles.

4. The combinational weighing method of claim 1 wherein said correction value is updated by determining the standard deviation of the distribution of said difference values obtained in previous cycles and setting a new value of said correction value equal to three times said standard deviation.

5. The combinational weighing method of claim 1 further comprising the step of specifying an upper limit value which is greater than said lower limit value, said selected combination having said first total weight which is the closest to said target value, greater than said lower limit value and less than said upper limit value.

6. In a combinational weighing apparatus comprising:

a plurality of weighing devices for weighing objects and outputting weight signals indicative of the weights of said weighed objects;

combination calculating means for operating in cycles to calculate, for each of said cycles, combinations of first weight signals from said weighing devices, to select a combination of said weighing devices with a first total weight according to a predefined criterion depending on a target value which is obtained by adding a correction value to a preset lower limit value, and to cause said objects to be discharged from said selected combination of weighing devices; and re-check means for receiving second weight signals from said selected combination of weighing devices after said combination is selected and before said objects in said selected combination of said weighing devices are discharged, said second weight signals being indicative of re-checked weights of said objects in said selected combination of weighing devices, and obtaining a second total weight by adding said re-checked weights;

the improvement wherein said apparatus further comprises:

difference-detecting means for obtaining a difference value in each of said cycles, representing the difference between said first total weight and said second total weight;

difference-storing memory means for storing difference values obtained in previous cycles by said difference-detecting means;

correction value calculating means for calculating said correction value with reference to difference values stored in said difference-storing memory means, such that desired work efficiency and yield of said combinational weighing apparatus can be attained; and setting means for setting said correction value calculated by said correction value calculating means in said combination calculating means.

7. The combinational weighing apparatus of claim 6 wherein said correction value calculating means determines said correction value according to the largest of the absolute values of difference values then stored in said difference-storing memory means.

8. The combinational weighing apparatus of claim 6 wherein said correction value calculating means determines said correction value according to the average of the absolute values of difference values then stored in said difference-storing memory means.

9. The combinational weighing apparatus of claim 6 wherein said correction value calculating means determines said correction value by determining the standard deviation of the distribution of difference values then stored in said difference-storing memory means and calculating three times said standard deviation.

10. In a combinational weighing method comprising the steps, in cycles, of:

combining first weight signals indicative of the initially measured weight values of objects being weighed by a plurality of weighing devices;

selecting a combination of said weighing devices with a first total weight according to a predefined criterion depending on a target value which is obtained by adding a correction value to a preset lower limit value;

discharging objects from said selected combination of weighing devices; and obtaining, after said selecting step and before said discharging step, second weight signals indicative of re-checked weight values of objects in said selected combination of weighing devices; and obtaining a second total weight by adding said re-checked weight values;

the improvement wherein said method further comprises the steps of:

storing cumulatively difference values between said initially measured weight values and said re-checked weight values for individual ones of said weighing devices; and updating said correction value with reference to the stored difference values for said selected combination of weighing devices obtained in previous cycles such that desired work efficiency and yield can be attained.

11. The combinational weighing method of claim 10 wherein said correction value is updated by determining dispersions corresponding to the distribution of said stored difference values for said selected combination of weighing devices.

12. The combinational weighing method of claim 11 wherein said correction value is updated by determining a standard deviation value from said determined dispersions.

13. The combinational weighing method of claim 12 wherein said correction value is updated by a value equal to three time said standard deviation.

14. In a combinational weighing apparatus comprising:
a plurality of weighing devices for weighing objects and outputting weight signals indicative of the weights of said weighed objects;
combination calculating means for operating in cycles to calculate, for each of said cycles, combinations of first weight signals from said weighing devices, said first weight signals being indicative of initially measured weight values by said weighing devices, to select a combination of said weighing devices with a first total weight according to a predefined criterion depending on a target value which is obtained by adding a correction value to a preset lower limit value, and to cause said objects to be discharged from said selected combination of weighing devices; and
re-check means for receiving second weight signals from said selected combination of weighing devices after said combination is selected and before said objects in said selected combination of said weighing devices are discharged, said second weight signals being indicative of re-checked weights of said objects in said selected combination of weighing devices, and obtaining a second total weight by adding said re-checked weights;

the improvement wherein said apparatus further comprises:
difference-detecting means for obtaining difference values, in each of said cycles, representing the differences between said initially measured weight values and said re-checked weights for individual ones of said weighing devices;
difference-storing memory means for storing said difference values obtained in previous cycles by said difference-detecting means;
correction value calculating means for calculating said correction value with reference to those of said difference values for said selected combination of weighing device stored in said difference-storing memory means, such that desired work efficiency and yield of said combinational weighing apparatus can be attained; and
setting means for setting said correction value calculated by said correction value calculating means in said combination calculating means.

15. The combinational weighing apparatus of claim 14 further comprising dispersion calculating means for calculating, in each of said cycles, new dispersion values for the distribution of said difference values corresponding to said selected combination of weighing devices and memory means for storing said new dispersion values.

16. The combinational weighing apparatus of claim 14 wherein said correction value calculating means determines said correction value from dispersion values stored in said memory means.

* * * * *